July 1, 1958 R. M. MINOCK 2,840,895
METHOD OF MAKING A MOULD FOR PRODUCING RINGS AND THE LIKE
Filed May 24, 1954 2 Sheets-Sheet 1
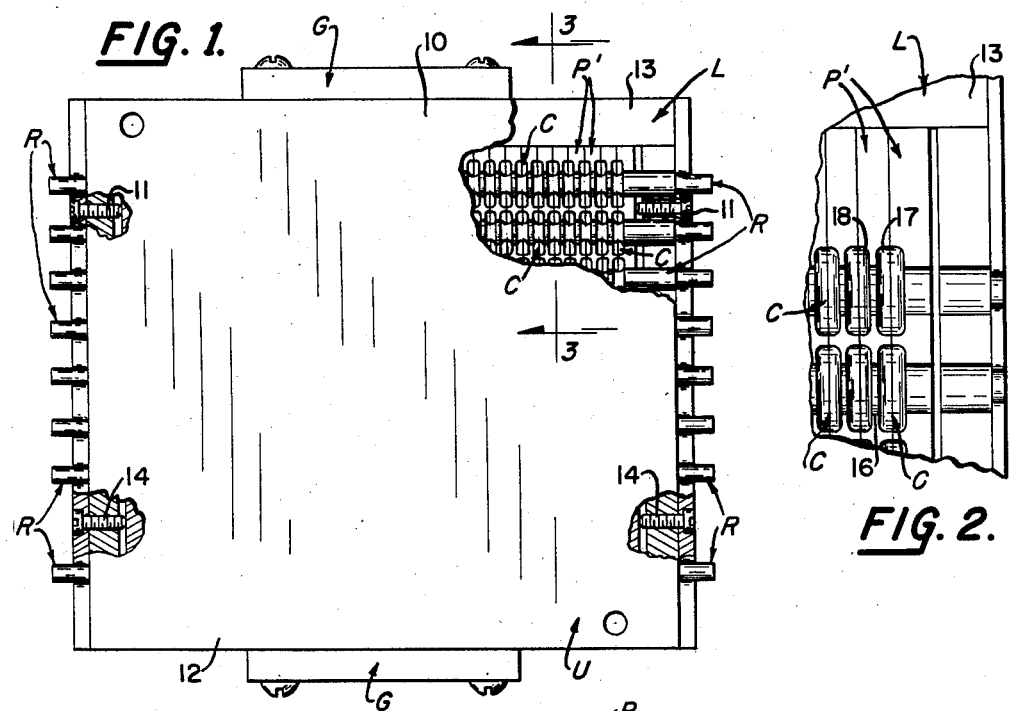
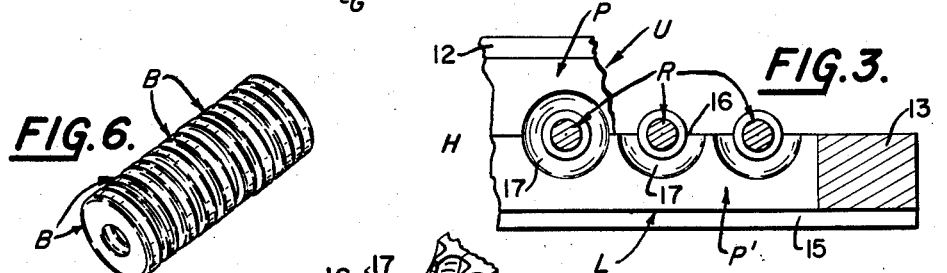
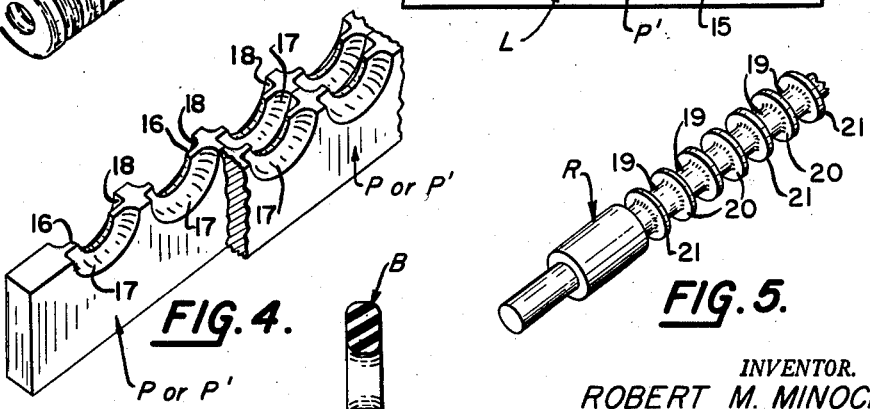
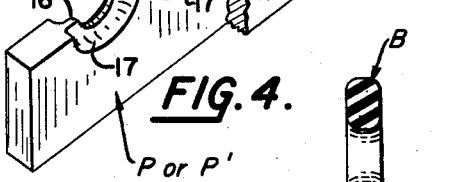
INVENTOR.
ROBERT M. MINOCK
BY
ATTORNEY July 1, 1958 R. M. MINOCK 2,840,895
METHOD OF MAKING A MOULD FOR PRODUCING RINGS AND THE LIKE
Filed May 24, 1954 2 Sheets-Sheet 2

INVENTOR.
ROBERT M. MINOCK
BY
ATTORNEY

United States Patent Office 2,840,895
Patented July 1, 1958

2,840,895

METHOD OF MAKING A MOULD FOR PRODUCING RINGS AND THE LIKE

Robert M. Minock, Denver, Colo.

Application May 24, 1954, Serial No. 431,857

5 Claims. (Cl. 29—433)

This invention relates to moulds and more particularly to moulds for making articles of rubber, synthetic rubber, plastic or like mouldable substances.

One of the objects of my invention is to produce an improved mould for making relatively thin circular articles by the application of heat and by employing such mouldable substances as rubber, synthetic rubber, plastic and like substances.

Another object is to produce an improved mould for making circular articles and particularly such an article having a hole therethrough and commonly known as an annular member.

Still another object is to produce a mould for rings or bands which will facilitate the moulding of the rings or bands from a suitable material by the use of a mould having a substantially reduced size over presently used moulds, thus enabling a more economic production of the articles.

A further object is to produce a mould for bands which will permit the bands to be moulded in side by side relation with the bands so positioned during moulding that each axis of a band coincides with a common axis.

A still further object is to produce an improved mould for bands which will permit a plurality of bands to be moulded in companion moulds on a common or central rod and after the moulding operation takes place to be easily removed from the rod.

Yet a further object is to produce an improved mould by the construction of companion mould members from laminated members so fabricated and assembled as to establish the desired form for the articles to be moulded.

Still another object is to produce a new method of making a mould for producing moulded circular articles.

A more specific object is to produce a new method of making a mould for producing rings or bands from a mouldable material.

A further object is to produce a new method of moulding an annular member.

A still further object is to produce a new method of moulding elastic rings or bands in quantity by moulds employing a space considerably reduced from moulds presently being employed.

Other objects of my invention will become apparent from the following description taken in connection with the accompanying drawings in which:

Figure 1 is a top view of an improved mould embodying my invention, a part of the top companion mould member being broken away to show details;

Figure 2 is an enlarged view of the broken away part of the mould of Figure 1 showing the rods removed;

Figure 3 is a section view taken on the line 3—3 of Figure 1;

Figure 4 is a perspective view of the some of the laminae which are precut and associated together to form one of the companion mould members;

Figure 5 is a perspective view of a portion of the rod as precut and formed and employed with the companion mould members to produce the holes of the moulded rings or bands;

Figure 6 is a perspective view of a group of rings or bands after being moulded and removed from the mould and the axial rod;

Figure 7 is a cross sectional view of a single ring or band moulded by my improved mould and in accordance with my improved method;

Figure 8:
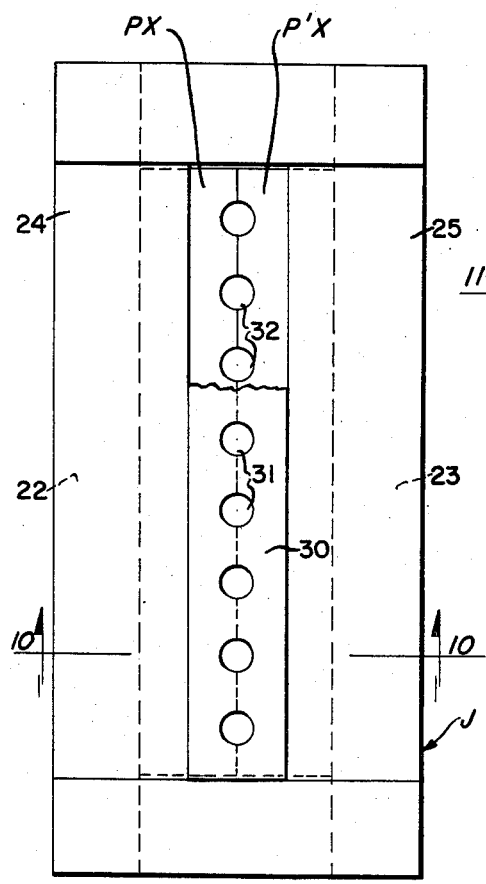
Figure 9:
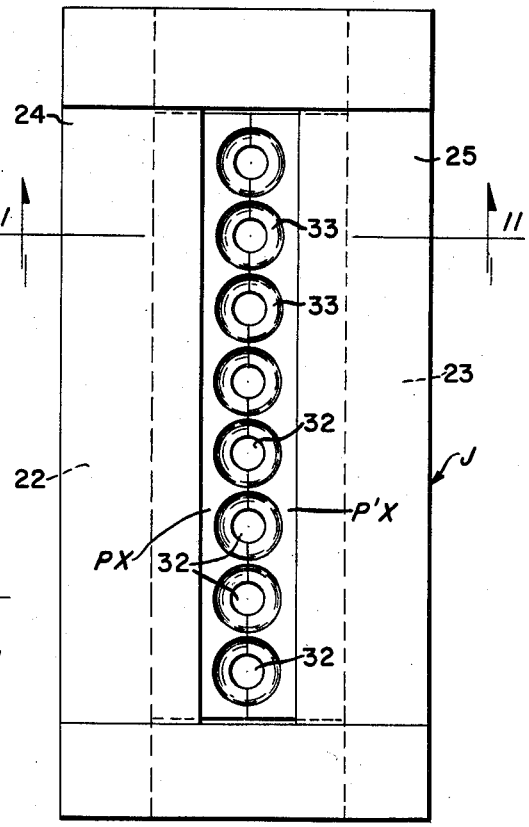
Figure 11:
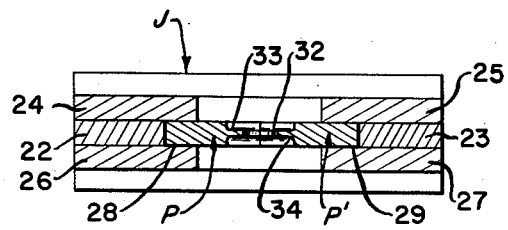
Figure 10:
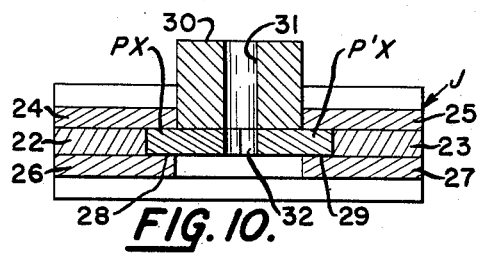

Figures 8 and 9 are views showing structure and steps in the method of making the laminae from which my improved mould members are constructed; and Figures 10 and 11 are sectional views taken on the line 10—10 of Figure 8 and line 11—11 of Figure 9.

Referring to the drawings in detail, I have disclosed my improved mould, by way of example, as one for making elastic rings or bands, but the invention is not to be considered as so limited as it can be embodied in moulds to make other kinds of moulded rings or like articles which are not considered elastic or even circular elements without a central opening.

My improved mould as disclosed has upper and lower companion mould units U and L of like construction so when used together with specially shaped rods R cooperation therewith will be capable of producing the circular elements shown as elastic rubber rings or bands B. The upper mould unit U is made from a plurality of like plates P arranged in side-by-side relation to produce a laminated construction with the plates forming laminae thereof. These plates or laminae are positioned in a rectangular frame 10 and held therein by stud bolts 11 which press laterally from opposed directions on the outer plates or laminae to hold them in pressure contact and in the frame all as disclosed in Figure 1. The upper mould unit has a cover or top sheet 12 suitably attached to the frame 10. In the same manner the lower mould unit L has like plates or laminae P arranged in side by side arrangement in a rectangular frame 13. These plates or laminae are held in the frame by screws 14 which press laterally from opposite directions on the outer plates as is apparent from Figure 1. The frame 13 has a bottom sheet 15 suitably attached thereto.

The construction of the plates P and P' which are companion pieces are very important to my invention for it is by them, together with the rods R to be later described in detail, that I am able to mould many circular members in an extremely small space and at a very low cost. The plates or laminae are best shown in Figure 4 which is a detailed perspective view of the plates. As shown in Figure 4 each plate P' or P is of uniform thickness, of uniform greater height than thickness and of uniform length which length will depend upon the number of circular elements such as the bands B are to be produced per mould. Each plate along one edge is fanned on out to have a plurality of semi-annular ridges 16 along its central longitudinal axis. Each ridge is fanned by cutting into the plate at its edge a "half hole" and then cutting inwardly from each side of the plate on the same axis as the "half hole" larger like counter sunk half holes 17 and 18. The semi-annular ridges along one edge of the length of each plate will be as closely spaced together as possible. If the circular members to be moulded are to have a somewhat circular cross section form on its outer periphery then the countersunk half holes 17 and 18 will be cut by a rotatable cutter to meet the ridge on a curve, as illustrated.

With this construction of the plates P and P' it will be seen that when the plates are assembled on edge in side by side relation in the frames for the upper and lower mould units U and L there will be provided in each unit a plurality of rows of semi-circular cavities C all having a common axis for each row. Then when the units are placed together in companion relation with the semicircular cavities facing each other the result will be a plurality of full circular cavities, in parallel rows, with the cavities in each row communicating with adjacent cavities through the holes H (see Figure 3) formed by the semi-annular mating ridges 16.

To complete my improved mould in order to produce annular members or rings in the form of the disclosed bands B, I employ the specially fanned rod R. There will be a rod for association with each row of aligned full circular cavities formed by the semi-circular cavities in each unit when the mould units are placed together in face to face relation.

Each rod R is cut to produce circular axially spaced grooves 19 which will have curved bottoms if the bands to be moulded are to have a curved shape on its inner surface as viewed in radial cross section. When the grooves 19 are cut there will be established the circular ridges 20, each having a cylindrical outer surface 21. The diameter of this surface is that of the rod before the grooves 19 are cut and this diameter will be such that the ridge 20 will fit into the opening established by mating ridges 16 of the plates when the mould units are placed together. The ridges are so axially spaced that each will cooperate with mating ridges 16. Thus with the rods R in place between the mould units, as shown in Figure 1, the full circular cavities of each row will no longer be in communication with each other and these cavities will be changed into annular cavities. When any mouldable material is now placed between the mould units and in the annular cavities formed by the plates and the rods, there can be moulded a band or ring in each annular cavity.

In using my improved mould all that needs to be done is to place the mouldable material between the upper and lower mould units with the rods in place and proceed to accomplish the moulding. If the bands are to be elastic a suitable rubber compound is placed between the mould units and these units then held together while heat is applied to perform the forming and curving operations. Other mouldable material can be used besides rubber. When the curving is completed the mould units are separated and the rods then removed. This will remove the bands from the mould units with the bands on the rods. With the bands being elastic they can be easily "skinned" off the rods in groups as shown in Figure 6. The bands will, no doubt, have some slight inter connection as some rubber during moulding will be pressed along the ridges 20 between cavities as a perfect sealed fit will not always be present. This very thin connecting web or "flash" will not be harmful as the moulded bands can be easily separated by a simple "pulling apart" operation. If the "flash" should be objectionable and it is desired to have it removed it can be done by known methods, such as "freezing" the bands and then while frozen tumbling them in a suitable tumbler machine. To aid in handling the top mould U it can have hard gripping members G.

It will be seen that my improved mould is so constructed that many bands can be moulded by a mould having a small size. In this way smaller presses and heating units can be used. If the bands were moulded flat as in prior methods then it is very obvious that only a small percentage of the number of bands could be moulded for each unit of space when compared with my improved mould where the bands are moulded "on edge" in a "side by side" relation with a common axis. The radial cross sectional contour of the band can be varied as desired by merely changing the shape of the cavity and the grooves in the rod. If solid discs are desired without holes then the rods R can be eliminated and the plates formed so that there will be no communication between cavities at the ridges 16.

Another feature of my invention resides in the method of making the moulds, especially the plates P and P' so that each pair of companion upper and lower plates will have matching half ridges and half countersunk holes. My method is simple but assures accuracy in making the plates which form laminae of each mould unit. Referring to Figures 8 to 11 it will be seen that in carrying out my method I first produce a jig J which has spaced parallel side pieces 22 and 23. Overlying these side pieces on each surface thereof are plates 24, 25, 26 and 27 as shown. The plates extend inwardly further than the side pieces and with the side pieces form slots 28 and 29 facing each other and in a common plane. The plates and side pieces are held in proper relation by being welded to cross pieces, as shown at opposite ends.

With this jig it will be seen that two rectangular flat plates PX and P'X can be placed in side by side relation in the slots 28 and 29 with the inner edges of the plates in contact, all as illustrated in Figure 8. After these plates PX and P'X, from which the final mould plates P and P' are to be made, are in position in the jig a template block 30 is positioned on one side of the jig between companion overlying plates on one surface of the side members, such as the plates 24 and 25. This block just fits between the plates and is provided with spaced guide holes 31 on a longitudinal for a drill. These holes will have their axes passing through the line of contact between plates PX and P'X. If now the jig as set up in the manner shown in Figure 8 is used in a drill press with the holes 31 of the template block as guides for the drill, then holes 32 can be drilled through the plates PX and P'X as shown in Figures 8 and 10. As a result there will be mating half holes in each plate.

The template block is now removed and the next step is cutting the countersunk holes 33 and 34, at each through hole 32 in each surface of each plate PX and P'X to form the finished plates P and P'. This is easily accomplished by a rotating cutter having the desired cutting edge. The axis of the cutter will be held to coincide with the drilled hole 32 which can be done by using the hole as a guide. The countersunk holes on one surface will first be cut then the jig turned over and the countersunk holes on the other surface cut. This then establishes the semi annular ridges 16 on each plate P and P' and also the countersunk half holes 17 and 18 on each side thereof to thus complete the making of companion plates P and P' to be put into the mould units as laminae.

It will be noted that with this method of making the plates there will be assurance that companion upper and lower semi-annular ridges of the mould units will produce perfect circles as will the companion counter sunk half holes on each side of the companion ridges. Since all companion plates are cut in the same jig and with the same template block the plates when assembled in the mould units will assure that there will be cavities of uniform size and shape for producing uniform bands. The forming of the rods R can be done on a lathe so that the ridges 20 and grooves 19 will fit with the mating ridges and cavities of the mould units.

I am aware that modifications can be made in my improved mould shown by way of example all without departing from the fundamental principles involved. Also the method of making the mould can be varied without being outside of my concept of making. Therefore I desire it to be understood that the scope of my invention is not to be limited except in accordance with the structural and method terms of the appended claims and equivalent thereof.

What is claimed is:

1. A method of making a mould for producing a plurality of circular members which comprises cutting into the opposite sides of a pair of plates held in edge to edge relation circular recesses with the axes of each recess on each side of a plate coinciding with and intersecting the line of engagement of the edges of the plates, mounting in companion mould units the plates so cut with one of each plates of each pair of plates which were simultaneously cut with circular recesses being mounted in side by side relation in one mould unit and the each other plate of each pair of plates being mounted in the other mould unit in such manner that when the mould units are brought together the edges of each pair of plates will engage each other as they did when the circular recesses were being cut, said plates in each unit being so positioned with each other that the axes of the recesses are aligned.

2. A method of making a mould for producing a plurality of annular members which comprises cutting into the opposite sides of a pair of plates held in edge to edge relation circular recesses with the axes of each recess on each side of a plate coinciding with and intersecting the line of engagement of the edges of the plates, and also cutting through the plates a hole on the same axis as the recesses, mounting in companion mould units the plates so cut with one of each plates of each pair of plates which were simultaneously cut with circular recesses being mounted in side by side relation in one mould unit and the each other plate of each pair of plates being mounted in the other mould unit in such manner that when the mould units are brought together the edges of each pair of plates will engage each other as they did when the circular recesses and holes were being cut, said plates in each unit being so positioned with each other that the axes of the recesses and holes are aligned, and then mounting a rod in association with the mould units that it will extend through the holes of the companion plates when the companion mould units are brought together in moulding relation.

3. The method of making a mould to produce a plurality of circular members which comprises building up each mould unit from a plurality of like plates in laminated relation, mounting the plates in each unit so that the plates in one unit will have like plates in the other unit in the same plane thereof and capable of edge to edge contact, and prior to assembly of the plates cutting into the plates which are to be in edge to edge contact mating semi-circular counter-sunk recesses on each surface thereof with the axes of each semi-circular recesses being at the contacting edge of the plate, said plates when assembled having mating rows of semi-circular recesses on a common axis.

4. The method of making a mould to produce a plurality of of annular members which comprises building up each mould unit from a plurality of like plates in laminated relation, mounting the plates in each unit so that the plates in one unit will have a like plate in the other unit in the same plane thereof and capable of edge to edge contact, and prior to assembly of the plates cutting into the plates which are to be in edge to edge contact mating semi-circular holes and larger mating semi-circular counter-sunk recesses on each surface thereof with the axis of each semi-circular hole and the axes of the semi-circular recesses being aligned and intersecting the contacting edge of the plate, said plates when assembled having mating rows of semi-circular rows and recesses on a common axis, and then providing a rod to fit in the holes formed by the semi-circular holes of the mating plate with said rod extending across the plates and through the annular cavities formed by the semi-circular recesses in mating plates.

5. The method of claim 4 in which the semi-circular recesses and the rod are so formed that the resulting annular cavity in which the annular member to be moulded will be round-like in radial cross-section.

References Cited in the file of this patent

UNITED STATES PATENTS

| | | |
|---|---|---|
| 335,935 | Kipper | Feb. 9, 1886 |
| 646,413 | Collet | Apr. 3, 1900 |
| 1,257,325 | De Lavaud | Feb. 26, 1918 |
| 2,224,337 | Bostwick | Dec. 10, 1940 |
| 2,284,000 | Kraft | May 26, 1942 |
| 2,479,695 | Morin | Aug. 23, 1949 |
| 2,510,840 | Stowe | June 6, 1950 |
| 2,537,089 | Rempel | Jan. 9, 1951 |
| 2,664,593 | Larson | Jan. 5, 1954 |